US007588811B2

(12) United States Patent
Blank et al.

(10) Patent No.: US 7,588,811 B2
(45) Date of Patent: Sep. 15, 2009

(54) COLUMNAR ADHESIVE LABEL ROLL

(75) Inventors: Paul C. Blank, LaCrosse, WI (US); Mark E. Keeton, Kettering, OH (US)

(73) Assignee: NCR Corporation, Dayton, OH (US)

( * ) Notice: Subject to any disclaimer, the term of this patent is extended or adjusted under 35 U.S.C. 154(b) by 746 days.

(21) Appl. No.: 10/804,953

(22) Filed: Mar. 19, 2004

(65) Prior Publication Data

US 2005/0208250 A1 Sep. 22, 2005

(51) Int. Cl.

*B32B 9/00* (2006.01)
*B65D 65/28* (2006.01)
*B32B 7/12* (2006.01)

(52) U.S. Cl. .................... 428/40.1; 428/41.8; 428/42.1; 428/43; 428/343; 428/906

(58) Field of Classification Search ................ 428/40.1, 428/41.8, 194, 42.1, 43, 195.1, 343, 906; 283/81
See application file for complete search history.

(56) References Cited

U.S. PATENT DOCUMENTS 2,170,147 A * 8/1939 Lane .......................... 206/447
2,294,347 A 9/1942 Bauer
2,349,710 A 5/1944 Evans
2,684,316 A 7/1954 Warshaw
2,721,810 A 10/1955 Schram
2,867,317 A 1/1959 Vogt
2,940,868 A 6/1960 Patchell
3,503,782 A 3/1970 Ayres
3,741,786 A 6/1973 Torrey
4,884,826 A * 12/1989 Slagsvol ........................ 281/2
4,889,234 A 12/1989 Sorensen et al.
5,061,535 A 10/1991 Kreckel et al.
5,299,833 A 4/1994 Madole, Jr.
5,578,352 A * 11/1996 Smith ........................ 428/40.1
5,691,437 A 11/1997 Main
5,725,320 A 3/1998 Austin et al.
5,782,494 A 7/1998 Crandall et al.
5,926,197 A 7/1999 Kessler
5,985,441 A 11/1999 Szczepaniec et al.
6,040,026 A 3/2000 Iwabuchi et al.
6,139,932 A 10/2000 Kline
6,268,032 B1 * 7/2001 Mertens et al. ............ 428/40.1
6,352,751 B1 * 3/2002 Miles et al. ................ 428/40.1
6,383,631 B1 5/2002 Mehta
6,423,392 B1 7/2002 Koch et al.
6,509,077 B1 1/2003 Wantuch et al.
6,585,437 B1 7/2003 Wiklof et al.
6,830,795 B1 * 12/2004 Downs ...................... 428/40.1

* cited by examiner

*Primary Examiner*—Patricia L Nordmeyer
(74) *Attorney, Agent, or Firm*—Francis L. Conte

(57) ABSTRACT

A label roll includes a web having front and back surfaces wound in a roll. The back surface includes adhesive patches aligned in a column along the running axis of the web. The front surface includes a release strip behind the column of patches and laminated thereto in successive layers in the roll.

44 Claims, 6 Drawing Sheets

COLUMNAR ADHESIVE LABEL ROLL

BACKGROUND OF THE INVENTION

The present invention relates generally to stationery products, and, more specifically, to adhesive labels.

The ubiquitous adhesive label is available in a myriad of configurations for use in various applications, including specialty applications. The typical adhesive label includes pressure sensitive adhesive on its back side initially laminated to an underlying release liner. The release liner is typically coated with silicone to provide a weak bond with the adhesive for permitting the individual removal of labels from the liner when desired.

Adhesive labels may be found in individual sheets, or joined together in a fan-fold stack, or in a continuous roll. Label rolls are typically used in commercial applications requiring high volume use of labels.

More specifically, in the fast food industry specialty labels may be used in identifying individual food products in typical sales transactions. The label roll may be formed of thermal paper for sequential printing of individual labels in a direct thermal printer. Or, a thermal transfer printer may also be used.

The typical pressure sensitive adhesive label includes full surface adhesive on its back side which may interfere with the handling thereof during the food preparation process. An individual label identifying the corresponding food product is removed from the printer by the user who typically wears sanitary gloves. The label may inadvertently bond to the gloves, and this increases the difficulty of placing the label on the packaging for the intended food product.

Furthermore, the liner material used in the label roll results in waste, and correspondingly affects the cost of the roll. Linerless label rolls are conventionally known in which the front surface of the label web may be coated with a suitable release material, such as silicone, for providing an integrated liner in the web itself without the need for an additional liner sheet.

However, as the linerless web is unwound in the printer, the back side adhesive is exposed to the various parts of the printer and can inadvertently bond thereto leading to undesirable jamming of the printer.

Furthermore, the printer may include a typical cutting knife or cutting bar for cutting individual labels from the continuous web. The exposed adhesive on the linerless label roll therefore permits adhesive buildup on these cutting elements during prolonged operation of the printer.

Adhesive buildup on any of the various components of the printer contacting the adhesive side of the label is undesirable because it requires periodic cleaning or other maintenance to avoid printer jamming, which may nevertheless occur.

Accordingly, it is desired to provide an improved linerless label roll.

BRIEF SUMMARY OF THE INVENTION

A label roll includes a web having front and back surfaces wound in a roll. The back surface includes adhesive patches aligned in a column along the running axis of the web. The front surface includes a release strip behind the column of patches and laminated thereto in successive layers in the roll.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
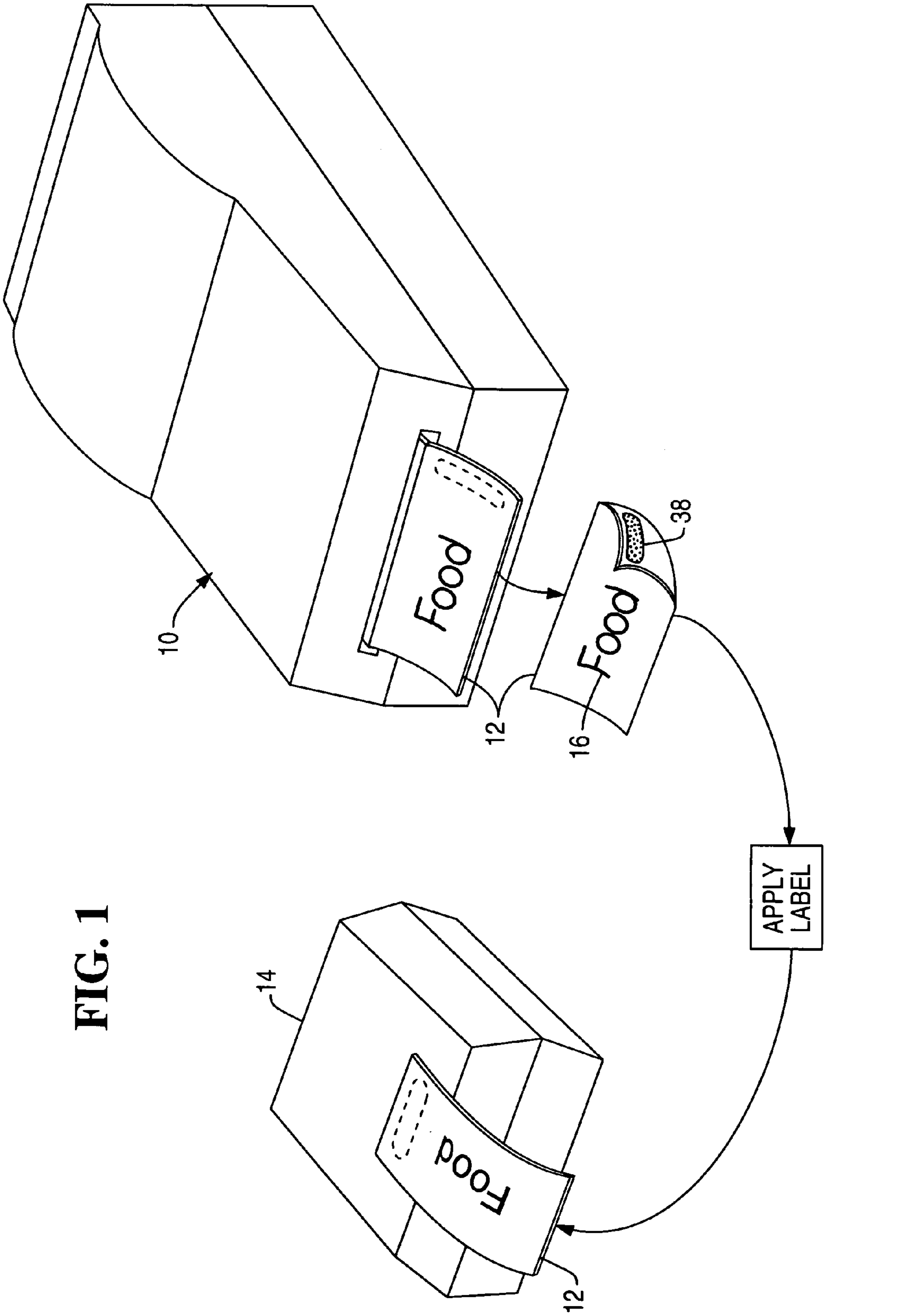
FIG. 1 is an isometric view of a thermal printer dispensing pressure sensitive labels in an exemplary application.

Illustrated in FIG. 1 is a conventional printer 10 configured for printing in sequence individual labels 12 for use in an exemplary fast food application. For example, food may be placed in a suitable food package 14 such as the paper box illustrated, or simple wrapping paper (not illustrated).

Print or identifying indicia 16 is printed on the label in the printer for identifying the contents of the package, for example. The individual printed label may then be removed from the printer and applied to the food package 14 as illustrated in the exemplary method shown in FIG. 1.

Figure 2:
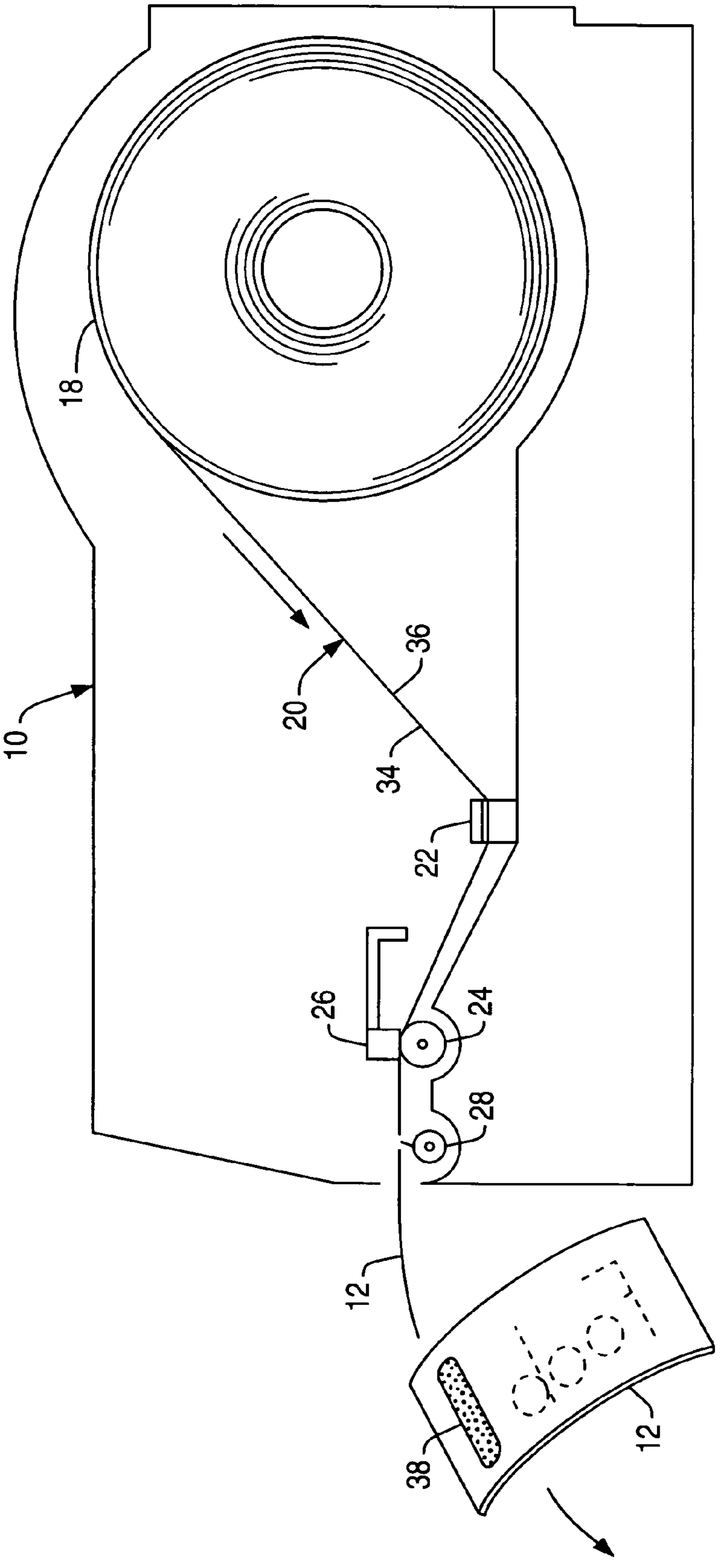
FIG. 2 is a side elevational internal view of the printer shown in FIG. 1 illustrating exemplary components along the feedpath of the label roll mounted therein.

FIG. 2 illustrates certain elements along the feedpath of the printer 10, which may otherwise have any conventional configuration, such as a direct thermal printer, or alternatively a thermal transfer printer. A label roll 18 is suitably mounted inside the printer either in a tray therefor, or on a support spindle extending through the center core thereof. The roll includes a continuous, elongate web 20 spiral wound in a multitude of overlapping layers or laminations.

Figure 3:
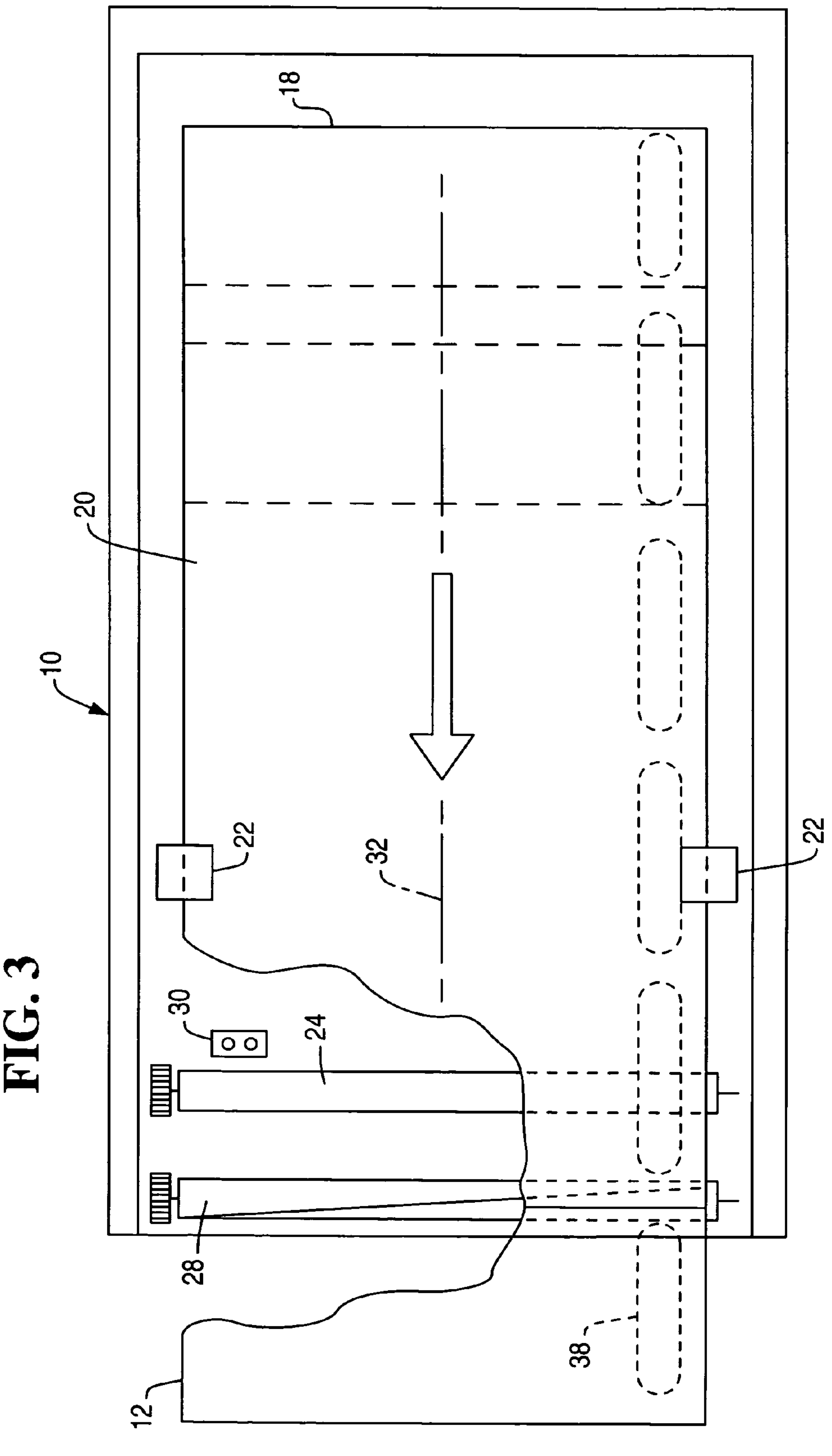
FIG. 3 is a top view inside the printer illustrated in FIG. 2 showing dispensing of the label roll therethrough.

The web 20 is dispensed from the roll inside the printer illustrated in FIGS. 2 and 3 along a suitable feedpath. The feedpath may include a pair of web guides 22 aligned transversely with each other on opposite sides of the web for guiding the web as it is dispensed through the printer. A platen roller 24 is disposed downstream of the guides and suitably engages the web for pulling the web forward through the printer for dispensing.

Disposed above the platen roller 24 is the printing head 26 which may have any conventional configuration, such as a thermal head assembly for use in direct thermal printing of the web which may be formed of suitable thermal paper. Alternatively, a thermal transfer ribbon ((not shown) may be used with ordinary printing paper for the web.

Disposed at the outlet end of the printer illustrated in FIGS. 2 and 3 is a suitable cutting blade 28 which may have any conventional configuration. In the exemplary embodiment illustrated in these Figures, the cutting blade 28 is rotatably mounted on a roller for suitably cutting the web along a straight line across its full width during operation. In an alternate embodiment, the cutting blade may be stationary, with the user simply tearing or cutting the dispensed label along the blade in a typical manner.

The exemplary printer illustrated in FIG. 3 also includes an index sensor 30 for sensing a suitable index mark contained on the web, if desired. Index sensors are conventional, and typically are optical components which detect a suitable mark on the web for permitting precise cutting of the individual labels 12 for the intended size. The cutting blade 28 is typically indexed with the platen roller 24 for coordinating the operation thereof. In this way, the distance between the cutting blade and the index sensor 30 is known and permits precise cutting of the web along the longitudinal or running axis 32 thereof during operation.

Figure 4:
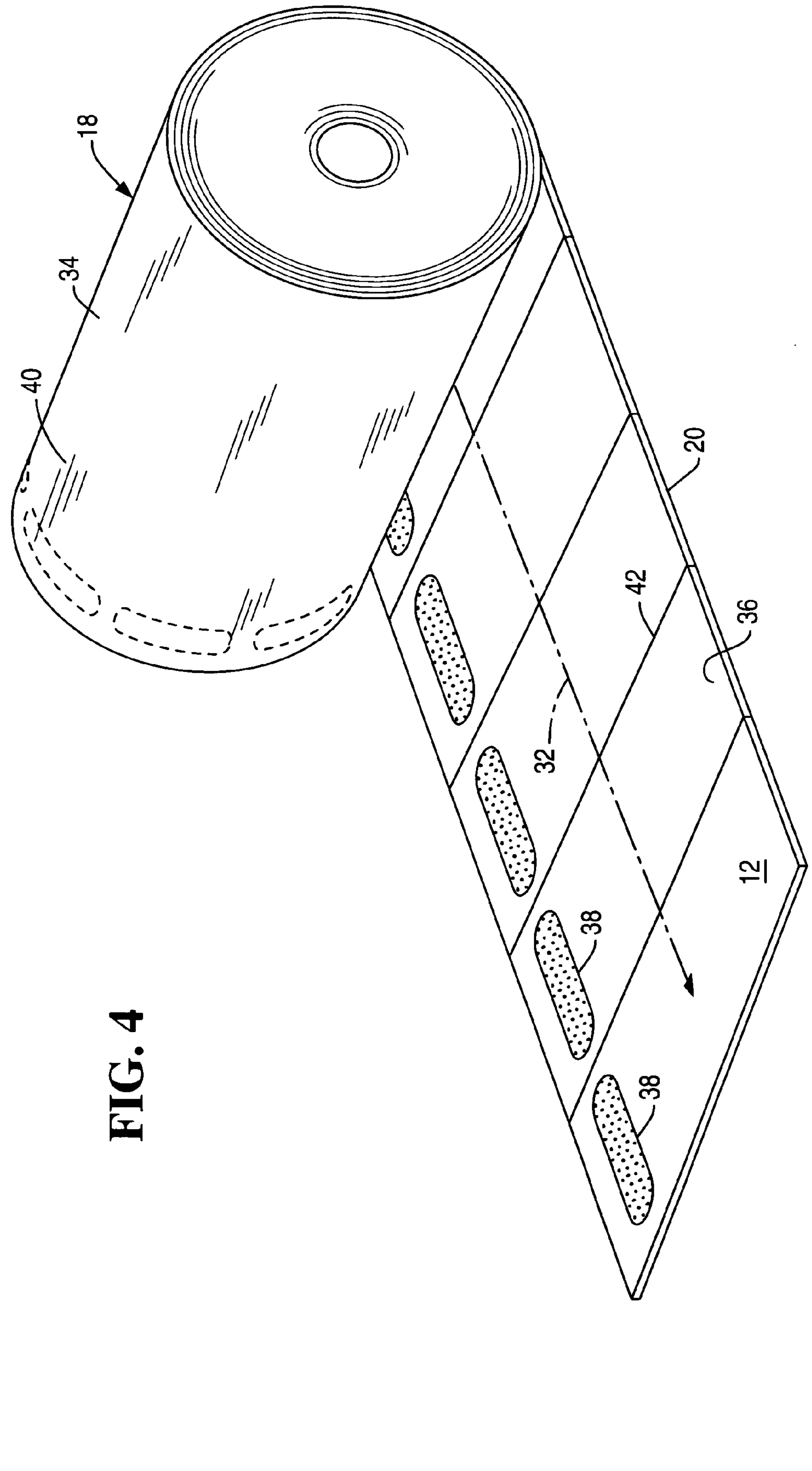
FIG. 4 is a isometric view of the label roll illustrated in FIGS. 1-3 in accordance with an exemplary embodiment.

The label roll 18 in the printer shown in FIGS. 1-3 is illustrated in more particularity in isolation in FIG. 4. The web 20 is preferably a single ply sheet of suitable label material, such as thermal paper. The web includes a front or top surface 34 which is mounted in the printer illustrated in FIG. 2 facing upwardly for being printed by the printing head 26. The web also includes an opposite back or bottom surface 36. The web is wound in the roll 18 in a spiral having a multitude of overlapping layers or laminations in which the back surface 36 is laminated against the front surface 34 of the upstream portions or inner layers of the web.

The back surface 36 illustrated in FIG. 4 includes a plurality of repeating adhesive spots or patches 38 aligned in, and spaced apart along, a column extending along the longitudinal running axis 32 of the web. The adhesive patches 38 may have any conventional composition such as the typical pressure sensitive adhesive which may be formulated for permanent bonding or temporary bonding to the intended surface, such as the package 14 illustrated in FIG. 1. In the preferred embodiment, the adhesive patches 38 effect weak bonds with the food package 14 to permit the repositioning of the individual labels without tearing of the label upon being removed from a surface.

Instead of providing full surface coverage of the adhesive on the back surface 36 illustrated in FIG. 4, the adhesive is provided solely in small patches in a relatively minor area of the back surface, with the remaining major area of the back surface being devoid of adhesive. In this way, the substantial reduction in surface area of the adhesive correspondingly decreases the buildup of adhesive inside the printer illustrated in FIG. 2 for increasing the time between any maintenance required therefor.

As further illustrated in FIG. 4, the front surface 34 of the roll includes a release strip 40 which extends along the running axis directly behind the column of adhesive patches 38. The release strip may be formed of any suitable releasing material, such as cured silicone or acrylic suitably coating or impregnating the web front surface. In this way, the column of adhesive patches 38 may be laminated to the release strip 40 in the successive layers of the roll illustrated in FIG. 4 without the need for a separate liner. The single ply web wound in the roll 18 is therefore linerless.

Accordingly, when the linerless roll is mounted in the printer illustrated in FIG. 2, the adhesive-less front surface 34 preferably faces upwardly to engage the web guides 22 and the printing head 26 for preventing adhesive contact therewith. The adhesive back surface 36 faces downwardly and is suitably spaced from adjacent portions of the feedpath for preventing inadvertent bonding therewith. The platen roller 24 is preferably coated with a suitable non-stick material such as polytetrafluoroethylene, typically known by the Teflon trademark brand material.

The non-stick platen roller 24 will therefore suitably drive or pull the web along its feedpath in the printer to permit individual labels 12 to be cut therefrom at the cutting blade 28 disposed immediately downstream from the platen roller. Since the adhesive patches 38 cover a relatively small portion of the area of the back surface 36, buildup of adhesive on the cutting blade 28 is correspondingly reduced, and limited to the small region aligned with the adhesive patches. Periodic maintenance for removing any adhesive buildup is therefore made easier, or adhesive accumulation may be insignificant within the life of the printer itself.

As shown in FIG. 4, the adhesive patches 38 are preferably aligned parallel along one lateral edge of the web 20, and closer thereto than to the opposite lateral edge of the web. In this way, the adhesive is isolated along only one edge of the web, with the remainder of the back surface 36 being devoid of the adhesive.

A particular advantage of the this columnar adhesive configuration is that most of the individual label 12 as illustrated in FIG. 1 is without adhesive and permits ready handling thereof, even by users wearing gloves, with little chance of grabbing the adhesive patch itself. The isolated adhesive patch may then be used for bonding the entire label to the package 14, in a cantilever fashion for example, for permitting grasping thereof for removal and repositioning of the label if desired.

In the preferred embodiment illustrated in FIGS. 3 and 4 for example, the web 20 is continuous along the running axis, and imperforate without perforations or die cuts. The individual labels 12 may then be defined by the configurations of the adhesive patches 38 and corresponding cutting of the labels by the cutting blade 28 illustrated in FIG. 2.

Figure 5:
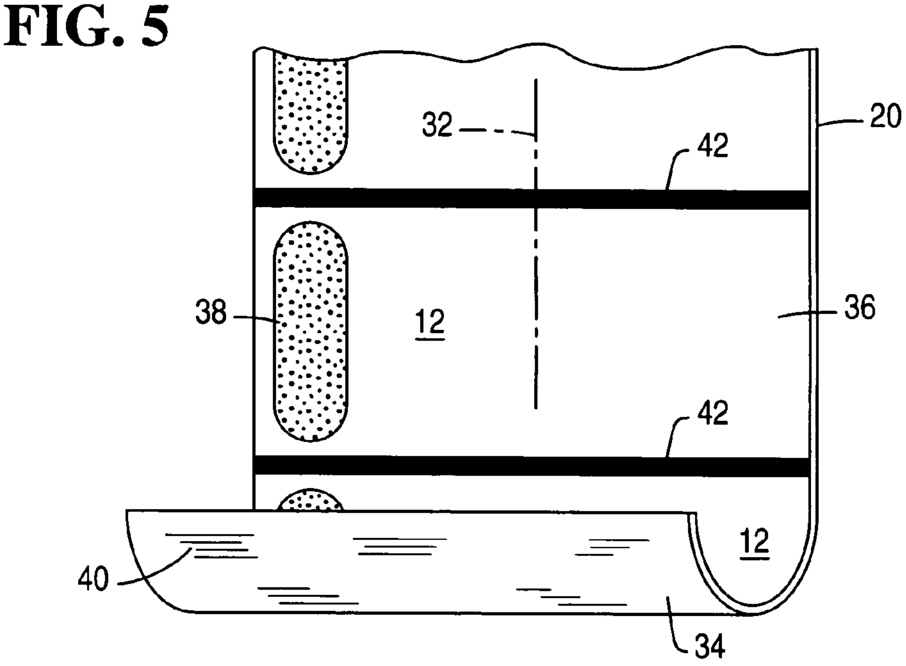
FIG. 5 is a back side view of the label roll illustrated in FIG. 4 in more detail.

In the preferred embodiment illustrated in FIGS. 4 and 5, the patches 38 are oval, with major axes disposed parallel to the running axis 32. The patches are identical to each other and repeat along the column thereof. The individual patches have convex leading edges, convex trailing edges, and straight side edges extending therebetween.

A particular advantage of this configuration is the smooth transitioning of the adhesive patches as they travel over the rotating platen roller 24 illustrated in FIG. 3 during operation. The adhesive on the convex leading edge of the patches transitions onto the roller with increasing width, and then leaves the roller with decreasing width for distributing the adhesive forces therebetween during operation.

In the preferred embodiment illustrated in FIGS. 4 and 5, the web 20 further includes a plurality of repeating index or sensor marks 42 disposed between corresponding ones of the adhesive patches 38 to define corresponding labels 12 each having a single adhesive patch. The index mark 42 may have various configurations, such as the black line which extends across the full width of the web in FIGS. 4 and 5.

During operation, the index mark 42 illustrated in FIG. 4 is disposed on the web back surface 36 and faces downwardly in FIG. 3 toward the index sensor 30. As each index mark passes over the index sensor 30 during operation, it is detected thereby. The computer controller of the printer then ensures that the cutting blade 28 is coordinated with the transport of the platen roller 24 for precisely cutting the web longitudinally between successive adhesive patches 38 in this exemplary configuration.

The index marks 42 may be located at any longitudinal position on the web such as between the adjacent adhesive patches, which permits the line marks 42 to provide the top and bottom edges of the individual labels once they have been cut from the web.

Figure 6:
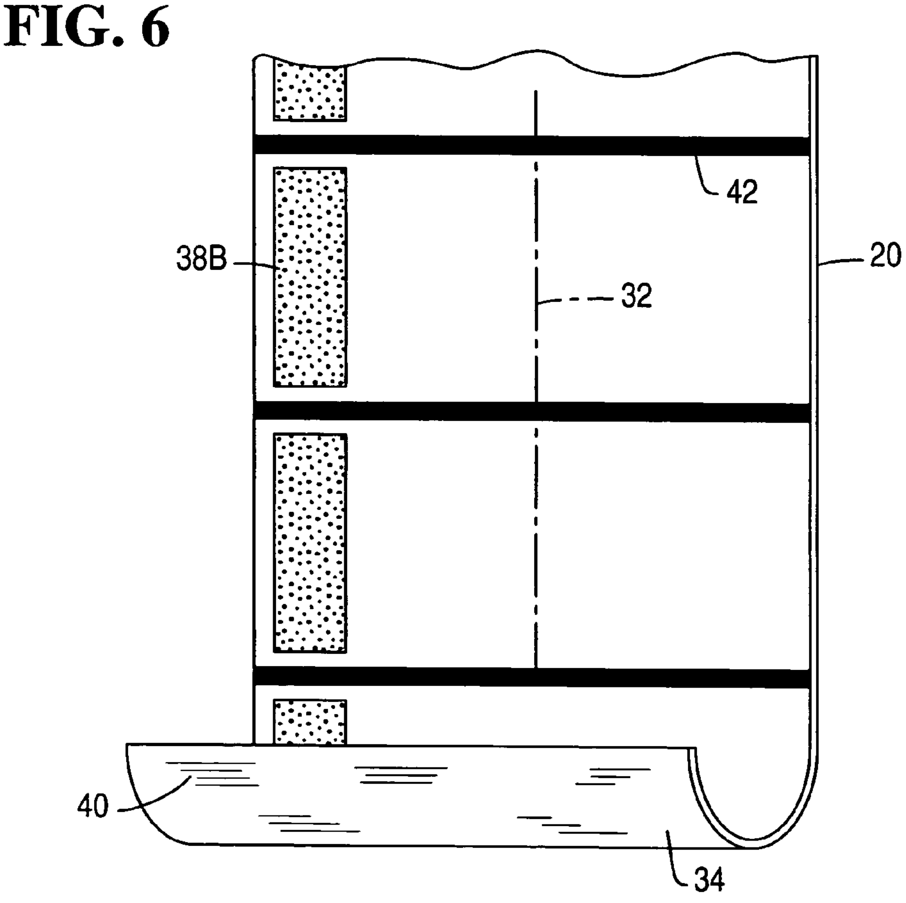
FIG. 6 is a back side view of a portion of the label roll in accordance with an alternate embodiment.

FIG. 6 illustrates an alternate embodiment of the label roll in which the adhesive patches 38B are rectangular instead of oval. In this embodiment, the rectangular patches have straight side edges aligned parallel with the running axis 32, and are closely adjacent to one edge of the web. The rectangular patches also have straight leading edges and trailing edges extending transversely or perpendicular to the running axis 32 of the web.

The rectangular adhesive patches 38B illustrated in FIG. 6 are preferably elongate along the running axis 32 and are taller or longer along that axis than they are wide transverse thereto. In this embodiment, the corresponding index marks 42 are also used between the adjacent rectangular patches 38B to define the corresponding labels 12, with each label having a single rectangular patch. Like the oval patch 38 illustrated in FIG. 5, the rectangular patch 38B is aligned closely along only one edge of the web leaving the majority of the remaining web adhesive-free.

In both embodiments illustrated in FIGS. 5 and 6, the release strip 40 is the same and covers completely the web front side 34 in full. The silicone release coating of the full area strip 40 protects the underlying printing formed in the thermal paper in the thermal printing process.

Figure 7:
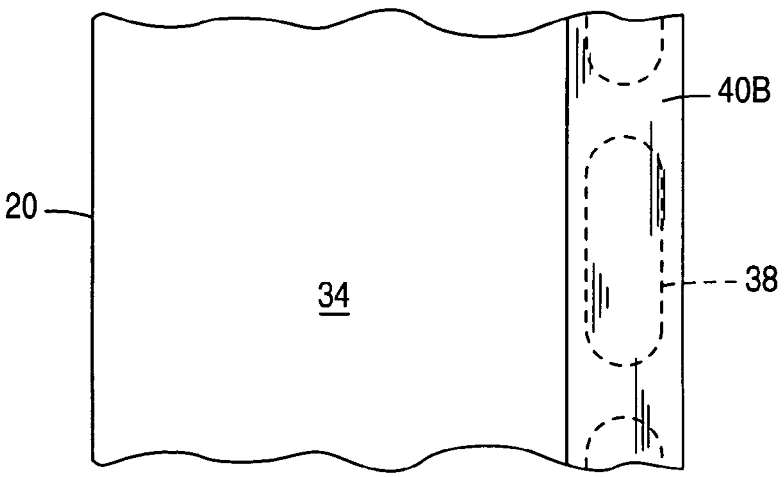
FIG. 7 is a front side view of a portion of the label roll in accordance with an alternate embodiment.

FIG. 7 illustrates an alternate embodiment for the release strip, designated 40B, which is narrow and conforms in width slightly wider than the column of the adhesive patches 38 illustrated in FIG. 5, or with the column of rectangular patches 38B illustrated in FIG. 6 if desired. This leaves the remainder of the web front side 34 devoid or free of any release material. This embodiment may be useful for thermal transfer printing in which a transfer ribbon is suitably provided between the printing head and the exposed front surface 34 of the web to the side of the narrow release strip 40B.

Figure 8:
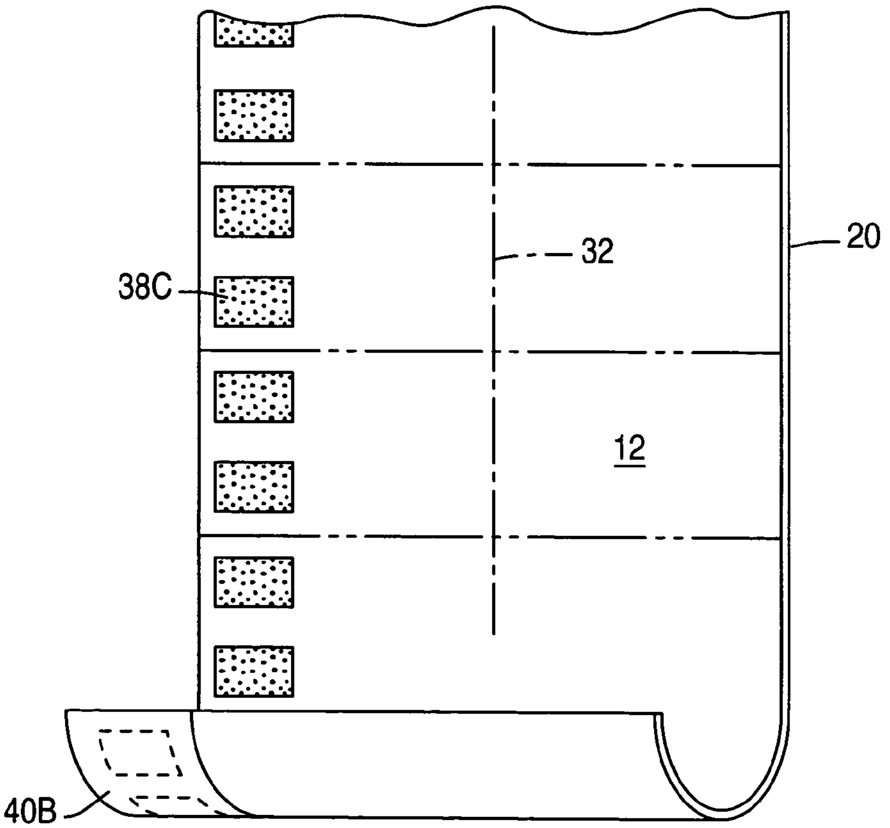
FIG. 8 is a back side view of a portion of the label roll in accordance with an alternate embodiment.

FIG. 8 illustrates yet another embodiment in which rectangular adhesive patches 38C are elongate transverse to the running axis 32 and are shorter in height along the running axis than they are wide transverse to the running axis. In this way, a column of relatively small rectangular patches may be used instead of the larger rectangular patches 38B illustrated in FIG. 6.

The embodiment illustrated in FIG. 8 is preferably devoid of the index marks between the small patches 38C for permitting variable label size if desired. For example, the web 20 may include a plurality of the labels 12 defined therein, with each label having a plurality of the small adhesive patches 38C.

The small patches increase the number of adhesive-free spaces between the patches in which the web may be cut for defining the size of the individual labels 12. Preferably the web is cut in the areas devoid of adhesive to reduce buildup of adhesive on the cutting blade.

In the various embodiments disclosed above, the small adhesive patches reduce the area of adhesive, and correspondingly reduce the associated problems of the adhesive during installation and operation of the linerless label roll in the printer. Reduced area adhesive correspondingly reduces the portions of the printer subject to adhesive buildup. The columnar alignment of the adhesive patches isolates any adhesive buildup to a minor portion of the printer feedpath, and correspondingly reduces the required maintenance therefor.

The train of separated adhesive patches permits cutting of the labels in the adhesive-free spaces for reducing adhesive buildup. And, if individual labels are cut along the adhesive patches themselves, subsequent cutting of labels in the adhesive-free zones provides a form of self-cleaning of the cutting blade.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

What is claimed is:

1. A printing label roll comprising:

a web of single-ply thermal printing paper having an exposed front surface and an opposite back surface wound in a roll;

said back surface including a plurality of discrete adhesive patches aligned and spaced apart longitudinally in a single column along a running axis of said web in a minor area of said back surface, with the remaining major area of said back surface being devoid of adhesive; and said front surface including a release strip extending along said running axis behind said column of adhesive patches, and laminated to said patches in successive layers in said roll.

2. A roll according to claim 1 wherein said patches are aligned along one lateral edge of said web, and closer thereto than to an opposite lateral edge of said web, and said labels extend transversely across said web in cantilever from said adhesive column to permit hand grasping of said adhesive-free major area.

3. A printing label roll comprising:

a web of thermal printing paper having a front printing surface and an opposite back adhesive surface wound longitudinally along a running axis in a roll having a plurality of overlapping layers in which said back surface is laminated against said front surface of inner layers of said web;

said back surface including a plurality of noncontiguous adhesive patches spaced longitudinally apart in a column of adhesive isolated on one side only of the transverse middle of said web in a minor area of said back surface, with the remaining area of said back surface being devoid of adhesive and including adhesive-free spaces transversely bridging said web longitudinally between said adhesive patches to isolate said patches in sequential labels and permit cutting of said web in said adhesive-free spaces to separate said labels; and said front surface including a release strip extending along said running axis behind said column of adhesive patches, and laminated to said patches in successive layers in said roll, with said patches being sized for bonding an individual label to a surface.

4. A roll according to claim 1 wherein said patches are aligned along one lateral edge of said web, and closer thereto than to an opposite lateral edge of said web, and said labels extend transversely across said web in cantilever from said adhesive column to permit hand grasping of said adhesive-free remaining area.

5. A roll according to claim 4 wherein said web is continuous along said running axis, and imperforate.

6. A roll according to claim 4 wherein said patches have straight edges aligned parallel with said running axis.

7. A roll according to claim 4 wherein said patches have straight edges extending transversely with said running axis.

8. A roll according to claim 4 wherein said patches are rectangular.

9. A roll according to claim 8 wherein said patches are elongate along said running axis.

10. A roll according to claim 9 wherein said web further includes corresponding index marks between adjacent patches to define corresponding labels, each label having a single adhesive patch.

11. A roll according to claim 8 wherein said patches are elongate transverse to said running axis.

12. A roll according to claim 11 wherein said web is devoid of index marks between said patches.

13. A roll according to claim 11 wherein each of said labels has a plurality of said adhesive patches.

14. A roll according to claim 4 wherein said patches have arcuate edges extending transversely with said running axis.

15. A roll according to claim 4 wherein said patches have convex leading edges, convex trailing edges, and straight side edges extending therebetween.

16. A roll according to claim 4 wherein said patches are oval, with major axes disposed parallel to said running axis.

17. A roll according to claim 16 wherein said web further includes corresponding index marks between adjacent patches to define corresponding labels, each label having a single adhesive patch.

18. A roll according to claim 4 wherein said release strip covers said web front side in full.

19. A roll according to claim 4 wherein said release strip is narrow and conforms in width with said column of adhesive patches, leaving the remainder of said web front side devoid thereof.

20. A roll according to claim 4 wherein said release strip comprises silicone coating said web front surface.

21. A method of using said label roll according to claim 4 comprising:

mounting said roll in a printer at an inlet end of a feedpath extending longitudinally to an outlet end terminating in a platen roller, printing head, and cuffing blade transversely bridging said feedpath, with said web being unwound from said roll along said feedpath to said platen roller at said outlet end;

printing indicia atop said web front surface in one of said labels; and dispensing said printed label from said printer outlet end, with said adhesive patch being disposed laterally at one end of said label, and said adhesive-free remaining area being cantilevered transversely therefrom for being grasped by hand.

22. A label roll for direct thermal printing in sequence individual labels therefrom in a thermal printer having a feedpath extending longitudinally between inlet and outlet ends and terminating at said outlet end in a platen roller, thermal printing head, and cuffing blade transversely bridging said feedpath, said label roll comprising:

an imperforate web of thermal printing paper having a front surface and an opposite back surface wound longitudinally along a running axis in a roll, with said front surface facing outwardly for being printed by said printing head, and said back surface facing inwardly to engage said platen roller for dispensing said web from said roll;

said back surface including a plurality of noncontiguous adhesive patches aligned in and spaced longitudinally apart along a single column of adhesive patches extending along said running axis of said web closer to one lateral edge of said web than to an opposite lateral edge of said web for reducing adhesive surface area exposure along said feedpath and over said platen roller, with adhesive-free spaces transversely bridging said web longitudinally between said adhesive patches to isolate said patches in sequential labels and permit transverse cutting of said web by said blade in said adhesive-free spaces to separate said labels; and said front surface including a release strip extending along said running axis behind said column of adhesive patches, and laminated to said patches in successive layers in said roll, with said patches being sized for bonding an individual label to a surface.

23. A roll according to claim 22 wherein said patches are oval, with major axes disposed parallel to said running axis.

24. A roll according to claim 23 wherein said web further includes corresponding index marks between adjacent patches to define corresponding labels, each label having a single adhesive patch.

25. A roll according to claim 24 wherein said release strip is narrow and conforms in width with said column of adhesive patches, leaving the remainder of said web front side devoid thereof.

26. A roll according to claim 22 wherein said patches are rectangular.

27. A roll according to claim 26 wherein said patches are elongate along said running axis.

28. A roll according to claim 26 wherein said patches are elongate transverse to said running axis.

29. A roll according to claim 28 wherein each of said labels has a plurality of said adhesive patches.

30. A roll according to claim 22 wherein said printer further includes an index sensor disposed along said feedpath and said web further includes corresponding index marks detectable by said sensor and disposed between adjacent patches to define corresponding labels, each label having a single adhesive patch and a majority adhesive-free portion cantilevered transversely therefrom.

31. A roll according to claim 30 wherein said release strip covers said web front side in full.

32. A label roll according to claim 22 in combination with said thermal printer further comprising:

said roll being mounted in said printer at said inlet end, with said web being unwound from said roll along said feedpath with said front surface facing said printing head and said back surface engaging said platen roller; and a printed label extends from said printer outlet end, with said printed label having printed indicia thereatop, said adhesive patch being disposed therebelow laterally at one end of said label, and said adhesive-free remaining area being cantilevered transversely therefrom for being grasped by hand.

33. A label roll for direct thermal printing in a thermal printer having a feedpath terminating in a platen roller, thermal printing head, and cutting blade, said label roll comprising:

an imperforate web of thermal printing paper wound longitudinally in a roll;

said web including a train of longitudinally separated identical adhesive patches on one surface facing inwardly to engage said platen roller and a different release strip on an opposite surface behind said train;

said patches being aligned longitudinally in a single narrow column along only one lateral edge of said web to define a sequence of corresponding labels each having a minor adhesive patch isolated inboard in a surrounding adhesive-free remainder of each label;

said adhesive-free remainder transversely bridging said web longitudinally between said patches to permit adhesive-free cutting of said web by said blade to separate said labels; and said labels extend transversely across said web in cantilever from said narrow Column to permit hand grasping of said adhesive-free remainder.

34. A label roll for printing in sequence individual labels therefrom in a printer including a feedpath extending longitudinally between inlet and outlet ends and terminating at said outlet end in a platen roller, printing head, and cutting blade transversely bridging said feedpath, said label roll comprising:

a web of thermal printing paper having a front surface and an opposite back surface wound longitudinally along a running axis in a roll sized to mount inside said printer at said inlet end, with said front surface facing outwardly for being thermally printed by said printing head, and said back surface facing inwardly to engage said platen roller for dispensing said web from said roll;

said back surface including a plurality of noncontiguous adhesive patches spaced longitudinally apart in a column of adhesive isolated on one side only of the transverse middle of said web in a minor area of said back surface for reducing adhesive surface area exposure along said feedpath and over said platen roller, with the remaining area of said back surface being devoid of adhesive and including adhesive-free spaces transversely bridging said web longitudinally between said adhesive patches to isolate said patches in sequential labels and permit cutting of said web by said blade in said adhesive-free spaces to separate said labels;

said front surface including a release strip extending along said running axis behind said column of adhesive patches, and laminated to said patches in successive layers in said roll, with said patches being sized for bonding an individual label to a surface; and said patches are aligned longitudinally in a narrow column along one lateral edge of said web, and said labels extend transversely across said web in cantilever from said column to permit hand grasping of said adhesive-free remaining area as said labels are sequentially dispensed from said printer.

35. A roll according to claim 34 wherein said patches are rectangular with straight edges aligned parallel with said running axis, and are longer along said running axis than wide transverse thereto in each of said labels, with a majority of each label being cantilevered therefrom.

36. A roll according to claim 34 wherein said patches are rectangular with straight edges extending transversely with said running axis, and are shorter along said running axis than wide transverse thereto in each of said labels, with a majority of each label being cantilevered therefrom.

37. A roll according to claim 34 wherein said patches are elongate along said running axis to reduce said minor surface area thereof and correspondingly increase said adhesive-free remaining area.

38. A roll according to claim 34 wherein said patches are elongate transverse to said running axis and shorter in height along said running axis than wide transverse thereto to increase the number of patches along said labels.

39. A roll according to claim 34 wherein:

said printer further includes an index sensor disposed along said feedpath; and said web further includes corresponding index marks between adjacent patches to define corresponding labels, each label having a single adhesive patch and a majority adhesive-free portion cantilevered transversely therefrom.

40. A roll according to claim 34 wherein said web is devoid of index marks between said patches and each label includes a plurality of small adhesive patches isolated along said one side thereof.

41. A roll according to claim 34 wherein said patches have convex leading edges, convex trailing edges, and straight side edges extending therebetween for transitioning onto said platen roller with increasing width and leaving said roller with decreasing width.

42. A roll according to claim 34 wherein said patches are oval, with major axes disposed parallel to said running axis for transitioning onto said platen roller with increasing width and leaving said roller with decreasing width.

43. A roll according to claim 34 wherein;

said web comprises printing paper for use with said printing head; and said release strip is narrow and conforms in width with said column of adhesive patches, leaving the remainder of said web front side devoid thereof for being printed by said printing head.

44. A label roll for printing in sequence individual labels therefrom in a printer including a feedpath extending longitudinally between inlet and outlet ends and terminating at said outlet end in a platen roller, printing head, and cutting blade transversely bridging said feedpath, said label roll comprising:

a web of label printing material having a front surface and an opposite back surface wound longitudinally along a running axis in a roll sized to mount inside said printer at said inlet end, with said front surface facing outwardly for being printed by said printing head, and said back surface facing inwardly to engage said platen roller for dispensing said web from said roll;

said back surface including a plurality of noncontiguous adhesive patches spaced longitudinally apart in a column of adhesive isolated on one side only of the transverse middle of said web in a minor area of said back surface for reducing adhesive surface area exposure along said feedpath and over said platen roller, with the remaining area of said back surface being devoid of adhesive and including adhesive-free spaces transversely bridging said web longitudinally between said adhesive patches to isolate said patches in sequential labels and permit cutting of said web by said blade in said adhesive-free spaces to separate said labels;

said front surface including a release strip extending along said running axis behind said column of adhesive patches, and laminated to said patches in successive layers in said roll, with said patches being sized for bonding an individual label to a surface;

said patches are aligned longitudinally in a narrow column along one lateral edge of said web, and said labels extend transversely across said web in cantilever from said column to permit hand grasping of said adhesive-free remaining area as said labels are sequentially dispensed from said printer;

said web comprising thermal printing paper; and said release strip covering said web front side in full to protect underlying print formed in said thermal printing paper by said printing head.

* * * * *